W. CORRIS.
Wheels for Vehicles.
No. 146,234.  Patented Jan. 6, 1874.
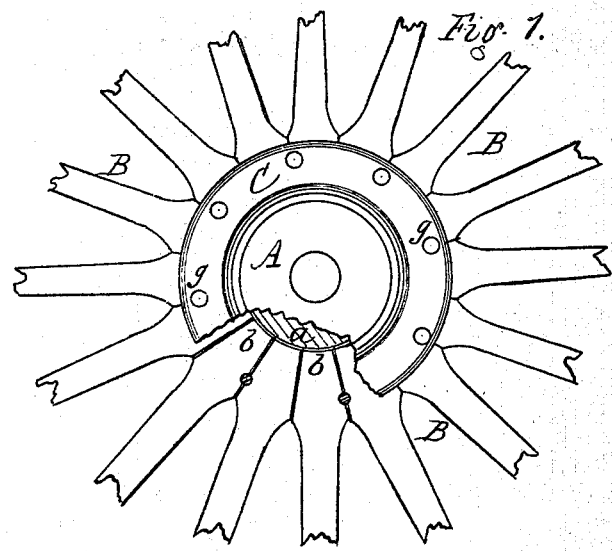
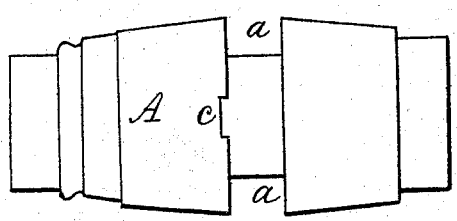
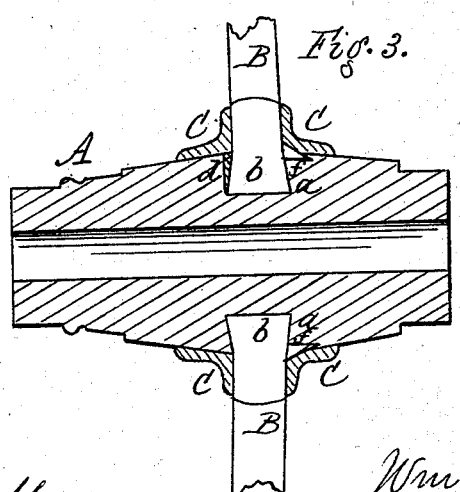
Witnesses.
E. B. Scott
C. W. Hebard
Inventor.
Wm Corris,
pr R. F. Osgood,
atty.

UNITED STATES PATENT OFFICE.

WILLIAM CORRIS, OF ROCHESTER, NEW YORK.

IMPROVEMENT IN WHEELS FOR VEHICLES.

Specification forming part of Letters Patent No. 146,234, dated January 6, 1874; application filed October 17, 1873.

*To all whom it may concern:*

Be it known that I, WILLIAM CORRIS, of the city of Rochester, in the county of Monroe and State of New York, have invented a certain new and useful Improvement in Carriage-Wheel Hubs; and I do hereby declare that the following is a full, clear, and exact description of the construction and operation of the same.

In the drawings, Figure 1 is an elevation, partially in section, of my improvement. Fig. 2 is a plan of the hub with the spokes removed from place. Fig. 3 is a longitudinal vertical section; Figs. 4 and 5, detail views.

My improvement belongs to that class in which a dovetailed groove is turned in the hub for the reception of the spokes, and in which side flanges are employed for clamping and securing the spokes in place. My invention consists in arranging upon a metallic hub having a dovetailed groove two side flanges for supporting the spokes and strengthening the hub, one of the said side flanges being secured in the groove by means of a metallic key, which is inserted between the said side flange and the periphery of the hub, the two flanges being connected together by bolts, as hereinafter described; and my invention further consists of a combination of parts to produce a durable and effective carriage-wheel, as will appear hereinafter.

A represents the wooden hub; B B, the spokes; and C C, the flanges or bands which secure the spokes after they are applied in place. The hub A is of ordinary form, but has a circumferential groove, *a*, turned in it, of proper depth to receive the ends of the spokes. This groove is of dovetailed form in cross-section, being widest at the bottom, and the ends *b b* of the spokes are made of the same form, and to fit closely. At one point in the groove a notch or offset, *c*, is made in the edge, of just such size as to admit the ends of the spokes to pass downward to the bottom of the groove. The ends of the spokes are inserted, in this manner, one after another, and then driven around into place in the groove by a mallet and set, or other appliance, fitting the dovetail of the groove closely at all points.

When the last spoke is inserted to fill the space a small wooden wedge, *d*, Figs. 3 and 4, is inserted in the notch *c*, on one side of it, driven in place closely, and glued, and the wedge is then covered by the metallic flange C, which secures the spokes at the sides. The flange C, on the inner end of the hub, is set close up to the groove, and secured by the metallic keys *f f*, Fig. 4, which are driven into the wood beneath the flange, and the sharp upper edge of which fits in a groove formed in the metal for the purpose. This keys the flange in place. When the spokes are all set, the outer flange is moved up against the spokes, and the two flanges are then secured together by the rivets *g g*, which pass between the joints of the spokes.

It will be noticed that the ends of the spokes all fit together, and form a continuous band of wood around the hub, as in all wheels of this class.

The inner faces of the flanges are set a little angling outward, as shown in Fig. 3, to give the proper "dish" to the wheel.

I am aware that a dovetailed groove has before been formed in the hub; and that the ends of the spokes have been made to fill the dovetail; but in such cases, so far as I am aware, the ends of the spokes have been made to expand by placing wedges in the lower ends, which enter the spokes as the latter are driven into the groove. I am also aware that an iron socket-piece has been used outside, through which the ends of the spokes pass to enter the dovetailed groove in the hub. Such methods of connection are objectionable, since wedges driven into the ends of the spokes are very uncertain in action, and work loose, and some of the spokes are made tighter than others. Their tendency, also, in some cases, is to split the wood.

By the employment of the notch or offset *c*, I can insert the ends of the spokes in the groove, and, as the ends of the spokes are all cut by machinery of the exact size of the groove, they fit accurately in place. The ends of these spokes being solid and applied dry, a perfect fit is secured, and the whole is tight and solid.

Having thus described my invention, I do not claim, broadly, fitting the ends of the spokes in a dovetailed groove of the hub; nor the use of side flanges for securing the spokes; but

What I claim is—

1. The combination, with the grooved hub A and dovetailed spokes B, of the keys $f$ and flanges C C, substantially as and for the purpose described.

2. The combination of the flanges C C, grooved hub A, keys $f$, wedge $d$, and spokes B, substantially as described, for the purpose specified.

In witness whereof I have hereunto signed my name in the presence of two subscribing witnesses.

WILLIAM CORRIS.

Witnesses:
R. F. OSGOOD,
H. K. VAN TYNE.